Patented Aug. 4, 1942

2,292,164

UNITED STATES PATENT OFFICE 2,292,164

PLASTIC MATERIAL FROM DIPHENYL AND ALKYLENE HALIDES AND COMPOSITIONS THEREOF

Robert L. Sibley, Nitro, W. Va., assignor to Monsanto Chemical Company, St. Louis, Mo., a corporation of Delaware No Drawing. Application July 28, 1939, Serial No. 287,137

11 Claims. (Cl. 260—2)

This invention relates to new plastic materials and more particularly to plastic products of the reaction between diphenyl and a group of alkylene halides and to compositions of matter comprising said products.

In accordance with this invention it has been discovered that useful plastic materials are produced from the reaction of diphenyl and an alkylene halide containing less than five carbon atoms, the reaction being carried out in the presence of a Friedel-Crafts catalyst. The plastic reaction products obtained possess good heat resistance and are substantially insoluble in and unaffected by water, acids, alkalies and most organic liquids. They are tough and flexible, in many ways resembling crude rubber and may be employed in compositions containing rubber or other natural or synthetic gums and plastics.

Suitable alkylene halides comprise compounds of the general formula $(CH_2)_x(Hlg)_2$ where $x$ is an integer greater than one but less than 5 and Hlg represents halogen. Typical examples include ethylene chloride, 1,3 propylene chloride, 1,3 propylene bromide, 1,2 propylene chloride, 1,2 isobutylene bromide, 1,2 isobutylene chloride, 1,3 isobutylene chloride and 1,4 butylene chloride.

The new plastic materials may be obtained by reacting one molar proportion of diphenyl with from two to three molar proportions of an alkylene halide as defined above. Any substantial departure from this range of proportions fails to produce the desired products. The structure of the plastic reaction products obtained is not known, however experimental evidence indicates that at least one molar proportion of alkylene halide condenses with one molar proportion of diphenyl. A series of experiments in which one molar proportion of diphenyl was reacted with from 2½ to 3 molar proportions of ethylene chloride indicated that two molar proportions of halide reacted with one molar proportion of diphenyl. These results can not be regarded as conclusive and it is to be understood that the invention is not limited thereby. Whatever the nature or extent of the reaction taking place it is an empirical fact that useful plastic materials are obtained by reacting an alkylene halide with diphenyl as described herein.

Aluminum chloride is preferably employed as the catalyst. Ferric chloride and stannic chloride, for example, have but a slight catalytic effect on the reaction. A small proportion of the aluminum chloride catalyst is sufficient, as for example 0.15 molar proportion based on the diphenyl. Higher proportions may be employed where desired with a resultant increase in the speed and vigor of the reaction. The final yield of plastic reaction product, however, is no greater and excessive amounts should be avoided due to the difficulty of controlling the reaction. It is preferred to employ from 0.036 to 0.30 molar proportion of aluminum chloride based on the diphenyl and within these limits a smooth reaction takes place with the subsequent production of plastic products exhibiting a maximum of desirable properties. The reactions are characterized by the evolution of heat and hydrogen halide. Near the end of the reaction the product swells considerably and sets to a jellylike mass. Prolonged heating beyond this stage or beyond the point where the evolution of hydrogen halide substantially ceases results in an inferior product and may completely destroy the plastic properties. It is therefore essential to stop the reaction at the proper stage which may be accomplished by the addition of water, preferably acidulated to enhance the removal of the aluminum chloride within a relatively short time after gelation takes place and subsequently isolating the product as hereinafter described. Where desired the properties of the plastic products may be modified by carrying out the reaction in the presence of sulfur. Although it is not certain whether sulfur actually enters into the reaction the properties of the final product are modified and for some purposes improved.

The following examples are illustrative of the methods of preparing the new plastic products but are in nowise limitative of the invention.

*Example I*

Substantially 77 parts by weight of diphenyl (approximately 0.5 molar proportion), 100 parts by weight of ethylene chloride (approximately 1.0 molar proportion) and 10 parts by weight of anhydrous aluminum chloride (substantially 0.075 molar proportion) were placed in a suitable container fitted with an agitator, thermometer and condenser. The stirred mixture was gradually heated to 70° C. whereupon a vigorous reaction set in with the evolution of hydrogen chloride. In approximately two hours the evolution of gas ceased and the mass set to a stiff gel. After a short cooling period substantially 400 parts by weight of dilute hydrochloric acid was added to the reaction mixture, agitated thoroughly throughout the mass and decanted. The soft mass was then washed several times with hot water followed with hot dilute soda ash and finally with hot water. The product at this stage had stiffened considerably and was light yellow in color. It was dried by milling on the warm rolls of a rubber mill. A good yield of a plastic elastic product was obtained which sheeted out on the mill very much the same as rubber.

Example II

Substantially 154 parts by weight of diphenyl (approximately one molar proportion) and substantially 339 parts by weight of 1,2 propylene chloride (approximately 3.0 molar proportions) were reacted in the presence of substantially 25 parts by weight of anhydrous aluminum chloride following the same general procedure set forth in the foregoing example. Heating at temperatures up to 60° C. was continued for 8 hours and the product isolated as described above. A dark colored thermoplastic product was obtained in good yield.

Example III

Substantially 154 parts by weight of diphenyl (approximately 1 molar proportion) and substantially 381 parts by weight of 1,3 isobutylene chloride (approximately 3 molar proportions) were reacted in the presence of substantially 25 parts by weight of anhydrous aluminum chloride by following the same general procedure described in Example I. The reaction mixture was heated for about 7 hours at temperatures up to 70° C. and the product worked up as described. A good yield of a tough red-brown thermoplastic was obtained.

Example IV

A preparation was carried out substantially as described in Example III, substituting 1,2 isobutylene chloride for 1,3 isobutylene chloride except that in this case approximately 19 parts by weight of aluminum chloride catalyst was employed. A good yield of a rubberlike thermoplastic product was obtained.

Example V

Into a suitable reactor were placed 462 parts by weight of diphenyl (substantially 3 molar proportions), 96 parts by weight of sulfur (substantially 3 molar proportions), 606 parts by weight of ethylene chloride (substantially 6 molar proportions) and 160 parts by weight of aluminum chloride. This mixture of ingredients was stirred and heated at substantially 75° C. for about 80 hours. Some hydrogen sulfide was evolved and considerable hydrogen chloride. The product was treated with 5% hydrochloric acid, washed with hot water, then with 5% soda ash solution and again with hot water. After working out most of the water mechanically drying was completed at 105° C. The dry product was a brown thermoplastic.

The new plastic products of this invention are readily miscible with natural rubber and add valuable properties to the rubber composition in which they are incorporated. For example the resistance of the rubber to attack by solvents is greatly enhanced. Solvent resistant plastic materials are in considerable demand for the preparation of gaskets, gasoline hose and the like. A convenient and simple method of estimating the relative resistance of a plastic material to attack by a solvent is to immerse a strip of the plastic in the solvent and measure the increase in the thickness of the strip. When a strip of ordinary rubber stock is immersed in a solvent such as gasoline it exhibits a very considerable increase in thickness. The following illustrate the improved properties imparted to natural rubber by the new plastic materials. Rubber stocks were compounded comprising

|  | Stock | |
|---|---|---|
|  | A | B |
|  | Parts by weight | Parts by weight |
| Smoked sheets of rubber | 100 | 100 |
| Plastic from diphenyl and ethylene dichloride |  | 37.5 |
| Carbon black | 60 | 60 |
| Zinc oxide | 5 | 5 |
| Stearic acid | 1 | 1 |
| Sulfur | 6 | 6 |
| Benzothiazyl thiobenzoate | 0.75 | 0.75 |
| Diphenyl guanidine phthalate | 0.5 | 0.5 |
| Antioxidant | 1.5 | 1.5 |

The stocks so compounded were cured by heating for thirty minutes at the temperature of 30 pounds of steam pressure per square inch and strips of the cured rubber products were immersed in gasoline and kerosene until there was no further increase in thickness. The results are set forth below:

| Stock | Increase in thickness in— | |
|---|---|---|
|  | Gasoline | Kerosene |
|  | Percent | Percent |
| A | 40.5 | 35.0 |
| B | 25.6 | 24.2 |

It is thus evident that rubber may be markedly protected from attack by solvents by the incorporation therein of the new plastic materials.

The new and preferred plastics do not adversely affect the modulus and tensile properties of rubber stocks in which they are incorporated and are substantially without effect on the rate of cure. In place of natural rubber they may be compounded with another synthetic rubber like material such as "Thiokol," the trade name of plastics prepared from sodium polysulfide and alkyl dihalides. "Thiokol" is quite troublesome to process and the incorporation of one of the preferred plastics materially alleviates this difficulty.

The new plastics may be employed in other compositions than those specifically set forth and in other ratios than those mentioned. Again the specific examples describing their preparation are to be understood as illustrative of the invention. Other means of effecting the reactions and other proportions of the reacting ingredients and catalyst may be utilized in preparing the plastics of this invention. The invention is limited solely by the claims attached hereto.

What is claimed is:

1. A plastic product which is flexible and extensible under stress at room temperature obtained by reacting in the presence of a Friedel-Crafts catalyst, one molecular proportion of diphenyl and from two to three molecular proportions of an alkylene chloride containing at least two but less than five carbon atoms and two chlorine atoms linked to different carbon atoms at a temperature of at least 60° C. to remove hydrogen chloride, the reaction being continued to the stage of gelation but stopped before a hard brittle product is formed.

2. A plastic product which is flexible and extensible under stress at room temperature obtained by reacting in the presence of a Friedel-Crafts catalyst, one molecular proportion of diphenyl and from two to three molecular proportions of a compound of the structure $$(CH_2)_x(Hlg)_2$$

where $x$ is an integer greater than one but less than five and Hlg represents a member of the group consisting of bromine and chlorine and the two halogen atoms are attached to different carbon atoms at a temperature of at least 60° C. to remove hydrogen halide, the reaction being continued to the stage of gelation but stopped before a hard brittle product is formed.

3. A plastic product which is flexible and extensible under stress at room temperature obtained by reacting in the presence of a Friedel-Crafts catalyst, one molecular proportion of diphenyl and from two to three molecular proportions of a compound of the structure $(CH_2)_xCl_2$ where $x$ is an integer greater than one but less than five and the two chlorine atoms are attached to different carbon atoms at a temperature of at least 60° C. to remove hydrogen chloride, the reaction being continued to the stage of gelation and stopped before a hard brittle product is formed.

4. A plastic product which is flexible and extensible under stress at room temperature obtained by reacting in the presence of anhydrous aluminum chloride, one molecular proportion of diphenyl and from two to three molecular proportions of a compound of the structure $(CH_2)_xCl_2$ where $x$ is an integer greater than one but less than five and the two chlorine atoms are attached to different carbon atoms at a temperature within the range of 60 to 75° C. to remove hydrogen chloride, the reaction being continued to the stage of gelation but stopped before a hard brittle product is formed.

5. A plastic product which is flexible and extensible under stress at room temperature obtained by reacting in the presence of a Friedel-Crafts catalyst, one molecular proportion of diphenyl and from two to three molecular proportions of ethylene chloride at a temperature within the range of 60 to 75° C. to remove hydrogen chloride, the reaction being continued to the stage of gelation but stopped before a hard brittle product is formed.

6. A plastic product which is flexible and extensible under stress at room temperature obtained by reacting in the presence of a Friedel-Crafts catalyst, one molecular proportion of diphenyl and from two to three molecular proportions of 1,2 isobutylene chloride at a temperature within the range of 60 to 75° C. to remove hydrogen chloride, the reaction being continued to the stage of gelation but stopped before a hard brittle product is formed.

7. A plastic product which is flexible and extensible under stress at room temperature obtained by reacting in the presence of a Friedel-Crafts catalyst, one molecular proportion of diphenyl and from two to three molecular proportions of 1,3 isobutylene chloride at a temperature within the range of 60 to 75° C. to remove hydrogen chloride, the reaction being continued to the stage of gelation but stopped before a hard brittle product is formed.

8. A plastic product which is flexible and extensible under stress at room temperature obtained by heating in the presence of anhydrous aluminum chloride one molecular proportion of diphenyl and two molecular proportions of ethylene chloride, the reaction being continued at a temperature within the range of 60 to 75° C. to remove hydrogen chloride until the stage of gelation is reached but is stopped before a hard brittle product is formed.

9. A composition comprising rubber in admixture with a plastic product which is flexible and extensible under stress at room temperature obtained by reacting in the presence of anhydrous aluminum chloride, one molecular proportion of diphenyl and from two to three molecular proportions of a compound of the structure $(CH_2)_x(Hlg)_2$ where $x$ is an integer greater than one but less than five and Hlg represents a member of the group consisting of bromine and chlorine and the two halogen atoms are linked to different carbon atoms at a temperature within the range of 60 to 75° C. to remove hydrogen halide, the reaction being continued to the stage of gelation but stopped before a hard brittle product is formed.

10. A composition comprising rubber in admixture with a plastic product which is flexible and extensible under stress at room temperature obtained by reacting in the presence of anhydrous aluminum chloride, one molecular proportion of diphenyl and from two to three molecular proportions of ethylene chloride at a temperature within the range of 60 to 75° C. to remove hydrogen chloride, the reaction being continued to the stage of gelation but stopped before a hard brittle product is formed.

11. A composition comprising rubber in admixture with a plastic product which is flexible and extensible under stress at room temperature obtained by heating one molecular proportion of diphenyl and from two to three molecular proportions of ethylene chloride in the presence of from 0.036 to 0.3 molecular proportion of anhydrous aluminum chloride, the reaction being continued at a temperature within the range of 60 to 75° C. to remove hydrogen chloride until the stage of gelation is reached but is stopped before a hard brittle product is formed.

ROBERT L. SIBLEY.